United States Patent
Chen et al.

(10) Patent No.: US 12,334,773 B2
(45) Date of Patent: Jun. 17, 2025

(54) POWER SOURCE TRANSFER CIRCUIT

(71) Applicant: Schneider Electric Industries SAS, Rueil Malmaison (FR)

(72) Inventors: Xiaohang Chen, Shanghai (CN); Haijun Zhao, Shanghai (CN); Ying Shi, Shanghai (CN); Jiamin Chen, Shanghai (CN); Yangfeng Song, Shanghai (CN); Qing Yang, Shanghai (CN); Jihua Dong, Shanghai (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 18/563,303

(22) PCT Filed: Jun. 28, 2023

(86) PCT No.: PCT/CN2023/103254
§ 371 (c)(1),
(2) Date: Nov. 21, 2023

(87) PCT Pub. No.: WO2024/002173
PCT Pub. Date: Apr. 1, 2024

(65) Prior Publication Data
US 2024/0186820 A1 Jun. 6, 2024

(30) Foreign Application Priority Data
Jun. 30, 2022 (CN) .......................... 202210771264.1

(51) Int. Cl.
*H02J 9/06* (2006.01)
*H01H 3/32* (2006.01)
*H02J 3/00* (2006.01)

(52) U.S. Cl.
CPC .............. *H02J 9/062* (2013.01); *H01H 3/32* (2013.01); *H02J 3/007* (2020.01)

(58) Field of Classification Search
CPC .......... H02J 9/062; H02J 3/007; H02J 3/0073; H02J 9/068; H01H 3/32
(Continued)

(56) References Cited

U.S. PATENT DOCUMENTS 11,211,816 B1 * 12/2021 Bose ................... H03K 17/0403
2021/0305840 A1 * 9/2021 Wu ......................... H02J 9/061

FOREIGN PATENT DOCUMENTS

CN 202840667 U 3/2013
CN 204349572 U 5/2015
(Continued)

OTHER PUBLICATIONS

International Search Report issued in PCT/CN2023/103254, mailed Sep. 13, 2023.
(Continued)

*Primary Examiner* — Richard Tan
(74) *Attorney, Agent, or Firm* — Troutman Pepper Locke LLP (57) ABSTRACT

The present invention discloses a power source transfer circuit for switching among a plurality of power sources to supply power to a load. The power source transfer circuit includes a first switch, a second switch and a bypass switch, wherein one of the plurality of power sources supplies power to the load via the first switch and the second switch, and wherein the bypass switch is connected in parallel to the second switch on a neutral line and is configured to control neutral overlapping duration during switching among the plurality of power sources. The power source transfer circuit including a bypass switch provided by the present disclosure can reduce the neutral overlapping duration to microseconds during power source transfer, so as to realize fast and reliable response.

12 Claims, 4 Drawing Sheets

(58) Field of Classification Search
USPC .......................................................... 307/86
See application file for complete search history.

(56) References Cited

FOREIGN PATENT DOCUMENTS

| | | | |
|---|---|---|---|
| CN | 109461609 A | | 3/2019 |
| CN | 209844635 | * | 12/2019 |
| CN | 111009956 A | | 4/2020 |
| JP | 2012120407 A | | 6/2012 |

OTHER PUBLICATIONS

Extended European Search Report dated May 13, 2025 for coresponding European Patent Application No. 23806161.8, 7 pages.

* cited by examiner

POWER SOURCE TRANSFER CIRCUIT

CROSS-REFERENCE TO RELATED APPLICATION

The present application claims the priority of China Application CN 202210771264.1 filed on Jun. 30, 2022 in China National Intellectual Property Administration.

TECHNICAL FIELD

The embodiments of the present disclosure relate to a power source transfer circuit.

BACKGROUND

Automatic transfer switch (ATS) is often used in a scenario where there are a plurality of power sources can supply power to a load, for example, in the emergency power supply system, a switch equipment that automatically switches the circuit in which the load is located from one power source to another (backup) power source, to ensure continuous and reliable operation of important loads. ATS is also often used in a power supply system for data center to ensure uninterrupted data services.

SUMMARY

At least one embodiment of the present disclosure provide a power source transfer circuit for switching among a plurality of power sources to supply power to a load. The power source transfer circuit comprises a first switch, a second switch and a bypass switch, wherein one of the plurality of power sources supplies power to the load via the first switch and the second switch, and wherein the bypass switch is connected in parallel to the second switch on a neutral line and is configured to control neutral overlapping duration during switching among the plurality of power sources.

For example, in the power source transfer circuit provided by an embodiment of the present disclosure, the second switch is a mechanical switch, and the bypass switch includes a third switch and a fourth switch, wherein at least one of the third switch and the fourth switch is a solid-state switch.

For example, in the power source transfer circuit provided by an embodiment of the present disclosure, the first switch includes a first solid-state switch and a second solid-state switch, and the second switch includes a first mechanical switch and a second mechanical switch, wherein the first solid-state switch is connected to the first mechanical switch, and a first power source of the plurality of power sources is connected to the load via the first solid-state switch and the first mechanical switch, the second solid-state switch is connected to the second mechanical switch, and a second power source of the plurality of power sources is connected to the load via the second solid-state switch and the second mechanical switch. When the first power source fails to supply power to the load, the first switch and the second switch are configured to switch to supply power to the load from the second power source.

For example, in the power source transfer circuit provided by an embodiment of the present disclosure, the first mechanical switch includes a first terminal and a second terminal connected to a first neutral line led out from the first power source, and the second mechanical switch includes a first terminal and a second terminal connected to a second neutral line led out from the second power source; the bypass switch includes a first bypass switch and a second bypass switch, wherein a first terminal of the first bypass switch is connected to the first terminal of the first mechanical switch, a second terminal of the first bypass switch is connected to the second terminal of the first mechanical switch, a first terminal of the second bypass switch is connected to the first terminal of the second mechanical switch, and a second terminal of the second bypass switch is connected to the second terminal of the second mechanical switch.

For example, in the power source transfer circuit provided by an embodiment of the present disclosure, the first bypass switch includes a third solid-state switch and a fifth mechanical switch connected in series, and the second bypass switch includes a fourth solid-state switch and a sixth mechanical switch connected in series, wherein the neutral overlapping duration during switching among the plurality of power sources is controlled by the third solid-state switch and the fourth solid-state switch.

For example, in the power source transfer circuit provided by an embodiment of the present disclosure, when the first power source supplies power to the load, the fifth mechanical switch in the first bypass switch remains on. Switching from supplying power by the first power source to the load to supplying power by the second power source to the load comprises: switching on the third solid-state switch in the first bypass switch when the first solid-state switch is switched off; switching off the first mechanical switch and switching on the sixth mechanical switch in the second bypass switch after the third solid state switch is switched on; switching on the fourth solid-state switch in the second bypass switch after the first mechanical switch is switched off and the sixth mechanical switch is switched on; switching off the third solid-state switch in the first bypass switch after the fourth solid-state switch is switched on; switching off the fifth mechanical switch in the first bypass switch and switching on the second mechanical switch after the third solid-state switch is switched off; switching off the fourth solid-state switch in the second bypass switch and switching on the second solid-state switch after the second mechanical switch is switched on, so as to realize the switching of the first power source to the second power source to supply power to the load.

For example, in the power source transfer circuit provided by an embodiment of the present disclosure, it further comprises an auxiliary circuit connected between a power source module including the plurality of power sources and the load. The auxiliary circuit includes: a compensation power source module configured to provide continuous power supply to the load during switching among the plurality of power sources; and an power fetching module connected between the power source module and the compensation power source module and configured to fetch power for the compensation power source module from one of the plurality of power sources.

For example, in the power source transfer circuit provided by an embodiment of the present disclosure, the compensation power source module includes a rectifier and an inverter connected in series, and the power fetching module includes a third mechanical switch and a fourth mechanical switch, wherein the third mechanical switch is connected between the first power source of the plurality of power sources and the rectifier, the fourth mechanical switch is connected between a second power source of the plurality of power sources and the rectifier, and the inverter is connected to the load.

For example, in the power source transfer circuit provided by an embodiment of the present disclosure, when the first power source supplies power to the load, the fourth mechanical switch remains on, so that when the first power source fails to supply power to the load, the inverter supplies power to the load.

For example, in the power source transfer circuit provided by an embodiment of the present disclosure, when the first power source stops supplying power to the load via the first solid-state switch and the first mechanical switch, the inverter supplies power to the load, and when the second power source starts supplying power to the load via the second solid-state switch and the second mechanical switch, the inverter stops supplying power to the load, so as to realize continuously supplying of power to the load during power source transfer.

At least one embodiment of the present disclosure provide a transfer device, which comprises any of the aforementioned power source transfer circuits for continuous supplying power to a load.

At least one embodiment of the present disclosure provides a power supply system for a data center, which comprises any of the aforementioned power source transfer circuits to realize continuity of data services.

BRIEF DESCRIPTION OF DRAWINGS

In order to illustrate the technical solution of the embodiments of the present disclosure clearer, a briefly introduction will be made with respect to the drawings of the embodiments below. Obviously, the drawings in the following description merely relate to some embodiments of the present disclosure, and are not limitations to the present disclosure.

DETAILED DESCRIPTION

In order to make the purpose, technical solution and advantages of the embodiments of the disclosure clearer, the technical solution of the embodiments of the disclosure will be described clearly and completely with conjunction of the drawings. Obviously, the described embodiments are part of the embodiments of the present disclosure, not all of the embodiments. Based on the described embodiments of the present disclosure, all other embodiments obtained by those ordinary skilled in the art without inventive efforts belong to the protection scope of the present disclosure.

It should be understood that various steps described in the implementation of the present disclosure may be performed in a different order and/or in parallel. In addition, the implementation may include additional steps and/or omit execution of shown steps. The scope of the present disclosure is not limited in this aspect.

Unless otherwise defined, technical or scientific terms used in the present disclosure should have their common meanings as understood by those ordinary skilled in the art to which the present disclosure belongs. The terms such as "first", "second" and the like used in the present disclosure do not indicate any order, quantity or importance, but are only used to distinguish different components. Likewise, words such as "a", "an", "the" or the like do not indicate a limit of quantity but indicate the existence of at least one item. Words such as "include", "contain" or the like mean that the elements or objects appearing preceding the word encompass the elements or objects listed following the word and their equivalents, without excluding other elements or objects. Words such as "connected", "interconnected" or the like are not limited to physical or mechanical connection, but can include electrical connection, whether direct or indirect.

As described above, automatic transfer switch (ATS) may be used in a scenario where a plurality of power sources supply power to a load. For example, in the power supply system, it is used to automatically transfer the circuit where the load is located from one power source to another to ensure continuous and reliable operation of important load.

Figure 1:
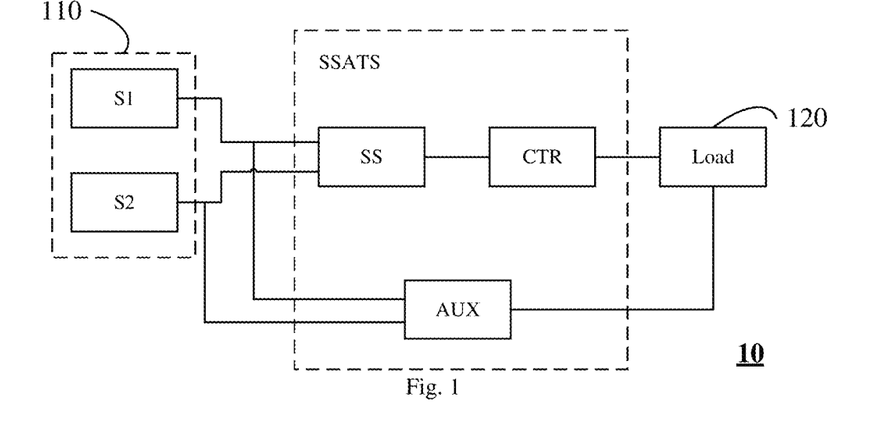
FIG. 1 shows a diagram of an example power supply system circuit according to at least one embodiment of the present disclosure.

FIG. 1 shows a diagram of an example power supply system circuit 10 according to an embodiment of the present disclosure.

As shown in FIG. 1, the example power supply system circuit 10 may include a power source module 110, a power source transfer circuit SSATS, and a load 120, wherein the power source module 110 is connected to the load 120 through the power source transfer circuit SSATS to supply power to the load 120.

The power source module 110 may include a plurality of power sources. As shown in FIG. 1, the power source module 110 includes a first power source S1 and a second power source S2. According to the embodiment of the present disclosure, one of the first power source S1 and the second power source S2 is the main power source, and the other is the backup power source. For example, when the first power source S1, which is the main power source, supplies power to the load 120, the second power source S2, which is the backup power source, supplies power to the load 120 in replace of the first power source S1 when the first power source S1 fails (e.g., overvoltage, undervoltage, power fault, frequency overrun, overload, etc.). For convenience of illustration, in the embodiment described herein, the power source module includes two power sources, but it should be understood that in other embodiments of the present disclosure, the power source module may include more than two power sources, such as three power sources, four power sources, etc., which is not limited herein. When the power source module includes more than two power sources, similarly, one of the power sources may be used as the main power source and the other power sources may be used as the backup power sources. In addition, the power source included in the power source module 110 may be a single-phase source or a three-phase source.

As shown in FIG. 1, the power source transfer circuit SSATS may include a solid-state switch SS, a mechanical switch CTR and an auxiliary circuit AUX, wherein the power source module 110 is connected to the load 120 via the solid-state switch SS and the mechanical switch CTR. For example, the solid-state switch SS may be a bidirectional switch composed of semiconductor switching devices, for switching among power source channels. The solid-state switch SS may be a bidirectional switch array composed of any semiconductor switching devices such as thyristors, metal oxide semiconductor field effect transistors (MOSFETs), insulated gate bipolar transistors (IGBTs), etc. In some embodiments, the solid-state switch SS may include a plurality of independent solid-state switches to be connected to different power sources in the power source module respectively. The mechanical switch CTR may be used to physically isolate the plurality of power sources in the power source module, for example, to physically isolate the first power source S1 and the second power source S2. In some embodiments, the mechanical switch CTR may be composed of a plurality of discrete elements, each of which may be controlled independently. Alternatively, in yet another embodiment, the mechanical switch CTR may be an integral, interlocking mechanical switch. Similar to the solid-state switch, the mechanical switch CTR may include a plurality of independent mechanical switches to be connected to different power sources in the power source module respectively.

As shown in FIG. 1, the example power supply system circuit 10 may further include an auxiliary circuit AUX connected between the power source module 110 and the load 120, wherein one end of the auxiliary circuit AUX is connected to each of the plurality of power sources in the power source module 110, respectively. As shown in FIG. 1, one end of the auxiliary circuit AUX may be connected to the first power source S1 and the second power source S2 in the power source module 110, respectively. According to some embodiments of the present disclosure, the auxiliary circuit AUX may include a compensation power source module for providing continuous power to the load as a compensation power source during power source transfer. The auxiliary circuit AUX may further include a power fetching module connected between the power source module 110 and the compensation power source module, for fetching power for the compensation power source module from one of the plurality of power sources in the power source module 110. The power source transfer circuit SSATS and the auxiliary circuit AUX included therein will be described in detail with reference to FIG. 2.

Figure 2:
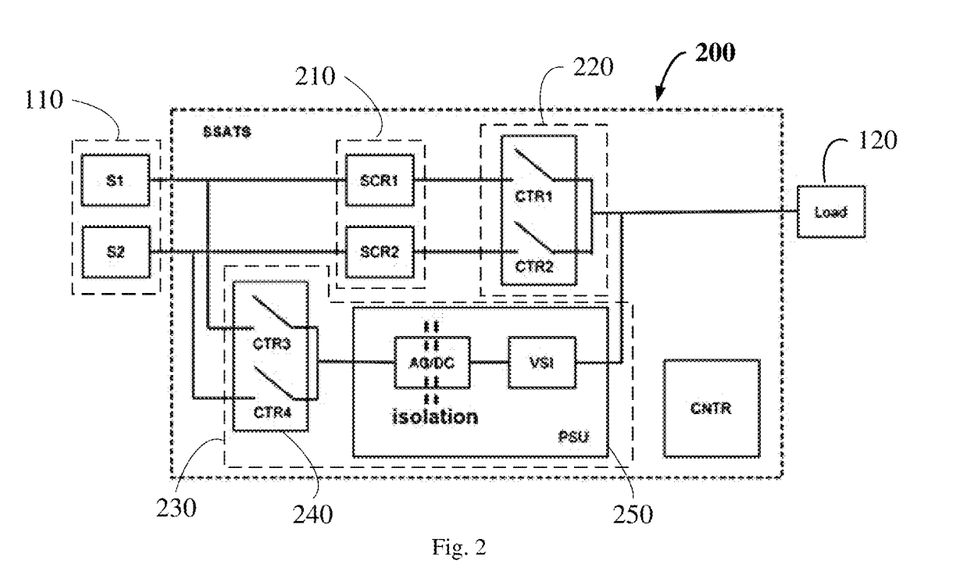
FIG. 2 shows a structural diagram of a power source transfer circuit according to at least one embodiment of the present disclosure.

FIG. 2 shows a diagram of a detailed structure of a power source transfer circuit 200 according to an embodiment of the present disclosure.

As shown in FIG. 2, the power source module 110 is connected to the load 120 via the power source transfer circuit 200. The power source transfer circuit 200 includes a first switch module 210, a second switch module 220 and an auxiliary circuit 230.

In the embodiment shown in FIG. 2, the first switch module 210 (corresponding to the solid-state switch SS of FIG. 1) may include a first solid-state switch SCR1 and a second solid-state switch SCR2, and the second switch module 220 (corresponding to the mechanical switch CTR of FIG. 1) may include a first mechanical switch CTR1 and a second mechanical switch CTR2, wherein the first solid-state switch SCR1 is connected to the first mechanical switch CTR1, and the first power supply S1 is connected to the load 120 via the first solid-state switch SCR1 and the first mechanical switch CTR1 to supply power to the load 120; and the second solid-state switch SCR2 is connected to the second mechanical switch CTR2, and the second power source S2 is connected to the load 120 via the second solid-state switch SCR2 and the second mechanical switch CTR2 to supply power to the load 120. The first switch module 210 and the second switch module 220 may be used together to implement the switching the power source that supplies power to the load 120, for example, from the first power source S1 to the second power source S2, or from the second power source S2 to the first power source S1.

In the embodiment shown in FIG. 2, the auxiliary circuit 230 (corresponding to the auxiliary circuit AUX of FIG. 1) may include a power fetching module 240 and a compensation power source module 250, wherein the power fetching module 240 is connected between the power source module 110 and the compensation power source module 250 to fetch power for the compensation power source module 240.

In some embodiments, the power fetching module 240 may be a mechanical switch which is the same as or similar to the mechanical switch CTR shown in FIG. 1, for physically isolating the plurality of power sources in the power source module. It may be composed of a plurality of discrete components that can be independently controlled, or may be an integral and interlocking mechanical switch. As shown in FIG. 2, the power fetching module 240 includes a third mechanical switch CTR3 and a fourth mechanical switch CTR4, wherein the third mechanical switch CTR3 is connected between the first power source S1 and the compensation power source module 250, and the fourth mechanical switch CTR4 is connected between the second power source S2 and the compensation power source module 250. Therefore, the power fetching module 240 may be used not only to switch the first power source S1 or the second power source S2 as the power supply to the compensation power source module 250, but also to provide a mutual physical isolation for the first power source S1 and the second power source S2. For example, when the third mechanical switch CTR3 is switched on and the fourth mechanical switch CTR4 is switched off, the first power source S1 may fetch power for the compensation power source module 250, whereas when the third mechanical switch CTR3 is switched off and the fourth mechanical switch CTR4 is switched on, the second power source S2 may fetch power for the compensation power source module 250.

The compensation power source module 250 is used to provide continuous power supply to the load 120 during the transfer. As shown in FIG. 2, the compensation power source module 250 may include a rectifier AC/DC (e.g., an isolated AC-DC rectifier) and an inverter VSI (e.g., a three-phase inverter) connected in series. In some embodiments, the rectifier AC/DC may be used to convert AC current received from the power source module 110 into DC current, whereas the inverter VSI may be used to convert DC current into AC current, which, for example, AC current synchronized with the phase of the output current of the power source module 110. As further shown in FIG. 2, the third mechanical switch CTR3 is connected between the first power source S1 and the rectifier AC/DC, and the fourth mechanical switch CTR4 is connected between the second power source S2 and the rectifier AC/DC. Therefore, when the third mechanical switch CTR3 is switched on, the current of the first power source S1 can flow into the rectifier AC/DC, whereas when the fourth mechanical switch CTR4 is switched on, the current of the second power source S2 can flow into the rectifier AC/DC. In addition, as shown in FIG. 2, the inverter VSI is connected to the load 120. When the current flowing out of the rectifier AC/DC flows through the inverter VSI, the inverter VSI may invert and output an inverted voltage, thereby supplying power to the load 120.

In the embodiment shown in FIG. 2, the power source transfer circuit 200 may further include a control unit CNTR. The control unit CNTR may be used to monitor the states of the first power source S1, the second power source S2 and the load 120, and may also be used to control all modules in the power source transfer circuit 200, such as the first switch module 210, the second switch module 220, the power fetching module 240 and the compensation power source module 250. In some embodiments, the control unit CNTR may be integrated in the power source transfer circuit 200, and connected with respective modules or any circuit position as shown in FIG. 2. In yet another embodiment, the control unit CNTR may be an independent module externally connected to the power source transfer circuit 200.

Next, the application of the power source transfer circuit 200 as shown in FIG. 2 in a power supply system circuit with different power sources will be described with reference to FIGS. 3A and 3B.

Figure 3A:
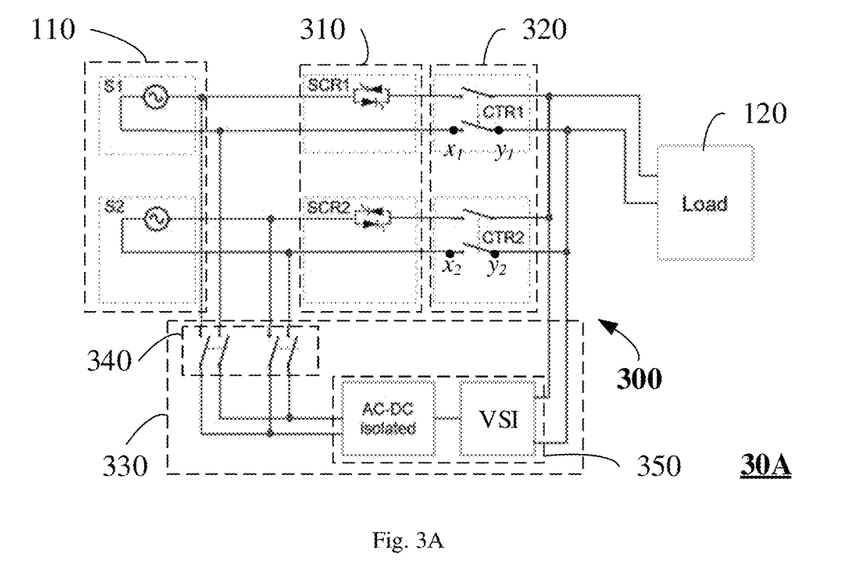
FIG. 3A shows a diagram of a single-phase source power supply system circuit including a power source transfer circuit according to at least one embodiment of the present disclosure.

FIG. 3A shows a diagram of a single-phase source power supply system circuit 30A including a power source transfer circuit 300.

As shown in FIG. 3, the single-phase source power supply system circuit 30A includes the power source module 110, the power source transfer circuit 300 and the load 120, wherein the power source module 110 is connected to the load 120 through the power source transfer circuit 300 to supply power to the load 120.

As described above, the power source module 110 includes the first power source S1 and the second power source S2, for which the specific details may refer to the above description with respect to FIG. 1 and will not be repeated here. However, as shown in FIG. 3A, both the first power source S1 and the second power source S2 here are single-phase sources, that is, the first power source S1 includes a phase line (also called "live line") and a neutral line (also called "neutral" or "neutral line") which form a single-phase loop for supplying power. Likewise, the second power source S2 also includes a phase line and a neutral line for supplying power.

The power source transfer circuit 300, similar to the power source transfer circuit 200 of FIG. 2, may include a first switch module 310, a second switch module 320 and an auxiliary circuit 330. As shown in FIG. 3A, the first switch module 310 includes a first solid-state switch SCR1 and a second solid-state switch SCR2, and the second switch module 320 includes a first mechanical switch CTR1 and a second mechanical switch CTR2, wherein the first solid-state switch SCR1 is connected to the first mechanical switch CTR1, and the first power source S1 is connected to the load 120 via the first solid-state switch SCR1 and the first mechanical switch CTR1 to supply power to the load 120; and the second solid-state switch SCR2 is connected to second mechanical switch CTR2, and the second power source S2 is connected to the load 120 via the second solid-state switch SCR2 and the second mechanical switch CTR2 to supply power to the load 120.

Further referring to FIG. 3A, the first solid-state switch SCR1 is connected to the phase line of the first power source S1, and the first mechanical switch CTR1 is connected to both the phase line and the neutral line of the first power source S1. As shown, the first mechanical switch CTR1 may include a first terminal x1 and a second terminal y1, both of which are connected to the neutral line of the first power source S1. Similarly, the second solid-state switch SCR2 is connected to the phase line of the second power source S2, and the second mechanical switch CTR2 is connected to both the phase line and the neutral line of the second power source S2. Specifically, the second mechanical switch CTR2 may include a first terminal x2 and a second terminal y2, both of which are connected to the neutral line of the second power source S2.

The auxiliary circuit 330 may include a power fetching module 340 and a compensation power source module 350. Wherein the power fetching module 340 is connected to the compensation power source module 350, the power fetching module 340 includes a third mechanical switch CTR3 and a fourth mechanical switch CTR4, and the compensation power source module 350 includes a rectifier AC-DC and an inverter VSI, for which the specific details may refer to the above description with respect to the auxiliary circuit 230 in FIG. 2, and will not be repeated here.

The power source transfer circuit 300 may further include a control unit (not shown), similar to the control unit CNTR of FIG. 2, which may be used to monitor the states of the first power source S1, the second power source S2 and the load 120, and control all modules in the power source transfer circuit 300. Specifically, the details may refer to the above description with respect to the control unit CNTR of FIG. 2, which will not be repeated here.

Figure 3B:
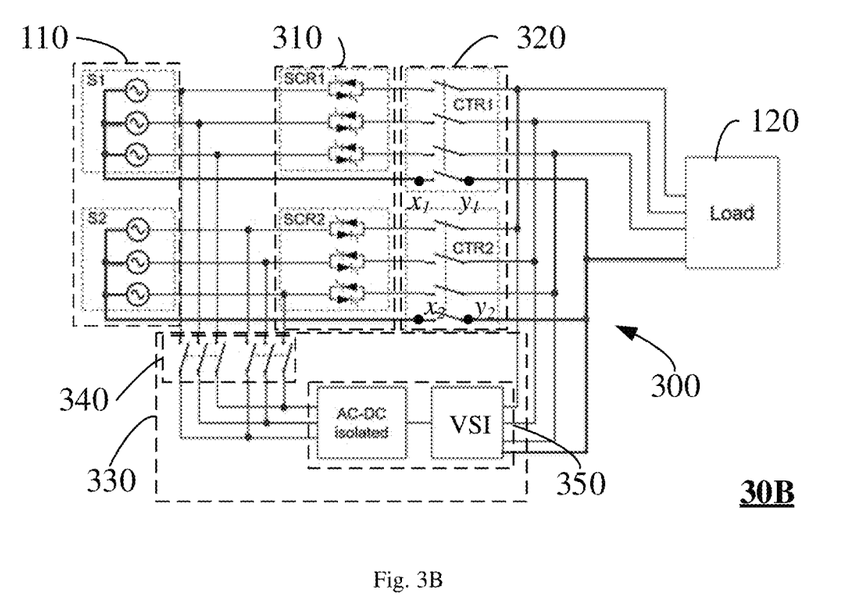
FIG. 3B shows a diagram of a three-phase source power supply system circuit including a power source transfer circuit according to at least one embodiment of the present disclosure.

FIG. 3B shows a diagram of a three-phase source power supply system circuit 30B including a power source transfer circuit 300.

The three-phase source power supply system circuit 30B of FIG. 3B is similar in circuit structure to the single-phase source power supply system circuit 30A of FIG. 3A, and the descriptions of the same parts are omitted here for the sake of brevity. However, unlike that shown in FIG. 3A, both the first power source S1 and the second power source S2 included in the power source module 110 in FIG. 3B are three-phase sources, that is, each of the first power source S1 and the second power source S2 includes three phase lines and a neutral line, wherein each of the three phase lines can form a single-phase loop with the neutral line for supplying power. Therefore, compared with the single-phase source, the three-phase source has higher efficiency and stronger power transmission capability, and is more suitable for heavy loads (e.g., commercial and industrial) cases.

Similar to the embodiment shown in FIG. 3A, in the embodiment as shown in FIG. 3B, the first solid-state switch SCR1 and the second solid-state switch SCR2 in the first switch module 310 are connected to the phase line of the power source, whereas the first mechanical switch CTR1 and the second mechanical switch CTR2 in the second switch module 320 are connected to both the phase line and the neutral line of the power source. As shown in FIG. 3B, the first solid-state switch SCR1 is connected to the phase line of the first power source S1, and the first mechanical switch CTR1 is connected to both the phase line and the neutral line of the first power source S1, wherein the first mechanical switch CTR1 may include a first terminal x1 and a second terminal y1 connected to the neutral line of the first power source S1. The second solid-state switch SCR2 is connected to the phase line of the second power source S2, and the second mechanical switch CTR2 is connected to both the phase line and the neutral line of the second power source S2, wherein the second mechanical switch CTR2 may include a first terminal x2 and a second terminal y2 connected to the neutral line of the second power source S2.

Next, logic for implementing power source transfer by the three-phase source power supply system circuit 30B of FIG. 3B will be described in detail in conjunction with FIG. 4.

Figure 4:
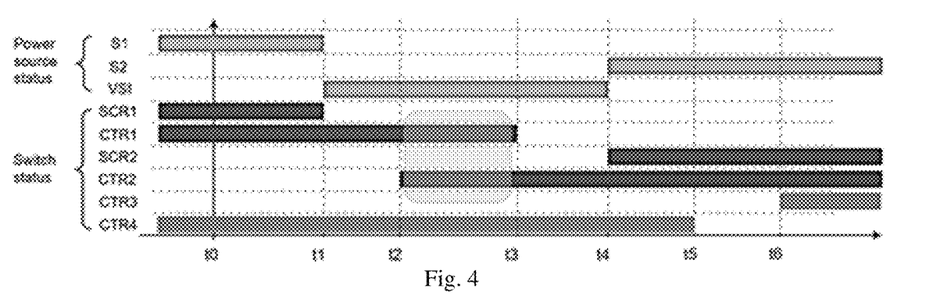
FIG. 4 shows a timing diagram of the three-phase source power supply system circuit of FIG. 3B.

FIG. 4 shows a timing diagram of the three-phase source power supply system circuit 30B of FIG. 3B.

It is assumed that during normal operation, the first power source S1 supplies power to the load 120 via the first solid-state switch SCR1 and the first mechanical switch CTR1. In this case, as shown in FIG. 4, before time t0, the first solid-state switch SCR1 and the first mechanical switch CTR1 are switched on, and the first power source S1 supplies power to the load 120 via the switched-on first solid-state switch SCR1 and the switched-on first mechanical switch CTR1; and the second solid-state switch SCR2 and the second mechanical switch CTR2 are switched off, so that the second power source S2 is disconnected from the load. Meanwhile, the fourth mechanical switch CTR4 in the auxiliary circuit 330 is in on state and the third mechanical switch CTR3 is in off state. In this way, when the first power source S1 fails, the second power source S2 can be used as the power supply to the compensation power source module 350, so that the compensation power source module 350 can continuously supply power to the load 120 to ensure continuous and reliable operation of the load 120. Moreover, before time t0, the VSI is in off state.

When the fault of the first power source S1 is detected by, for example, the control unit CNTR in FIG. 2, the control unit CNTR may control transferring from the first power source S1 to the second power source S2 to supply power to the load 120. For example, the control unit CNTR may implement the transferring from the first power source S1 to the second power source S2 by controlling the switch-on and switch-off of the first switch module 310 and the second switch module 320, so as to switch the power source for supplying power to the load 120 from the first power source S1 to the second power source S2.

As shown in FIG. 4, it is assumed that that the first power source S1 fails at time t0 and the control unit CNTR (not shown) detects the fault of the first power source S1 at time t1, and at time t1, the first solid-state switch SCR1 is switched off, and the first power source S1 stops supplying power to the load 120.

After the first solid-state switch SCR1 is switched off, the control unit CNTR then may control to switch off the first mechanical switch CTR1 and switch on the second mechanical switch CTR2. In order to ensure that the neutral line of the circuit always remains switched-on during the switching of power source to avoid zero potential drift, according to at least one embodiment of the present disclosure, the control unit CNTR first controls the second mechanical switch CTR2 to be switched on, and then switch off the first mechanical switch CTR1 after the second mechanical switch CTR2 is switched on. As shown in FIG. 4, after the first solid-state switch SCR1 is switched off at time t1, the control unit CNTR controls the second mechanical switch CTR2 to be switched on at time t2, and after the second mechanical switch CTR2 is switched on, controls the first mechanical switch CTR1 to be switched off at time t3. It should be noted that since there is a certain mechanical delay for the mechanical switch itself, when the mechanical switch receives an indication of on and/or off, it will take a period of time to practically implement the switching on and/or off of the mechanical switch. For example, the control unit CNTR indicates the second mechanical switch CTR2 to switch on at time t2, but the second mechanical switch CTR2 is actually switched on after a period of time from time t2. Similarly, the first mechanical switch CTR1 is actually switched off after a period of time from time t3.

After the second mechanical switch CTR2 is switched on and the first mechanical switch CTR1 is switched off, then the second solid-state switch SCR2 is switched on, so that the second power source S2 can supply power to the load 120 via the second solid-state switch SCR2 and the second mechanical switch CTR2, thereby implement the transferring from the first power source S1 to the second power source S2. As shown in FIG. 4, at time t4, the second mechanical switch CTR2 has been switched on and the first mechanical switch CTR1 has been switched off, as a result, the second solid-state switch SCR2 is switched on at time t4. At this time, the second power source S2 can supply power to the load 120 via the switched-on second solid-state switch SCR2 and the switched-on second mechanical switch CTR2.

In addition, during the transferring from the first power source S1 to the second power source S2 to supply power to the load 120, the compensation circuit module 350 in the auxiliary circuit 330 may be used to supply power to the load 120, so as to keep continuous power supply to the load 120 until the second power source S2 can supply power to the load 120 via the switched-on second solid-state switch SCR2 and the switched-on second mechanical switch CTR2. Specifically, when the first power source S1 stops supplying power to the load 120 via the first solid-state switch SCR1 and the first mechanical switch CTR1, the inverter VSI in the compensation circuit module 350 can supply power to the load 120, and then when the second power source S2 starts supplying power to the load 120 via the second solid-state switch SCR2 and the second mechanical switch CTR2, the inverter VSI stops supplying power to the load 120, thereby realizing continuously supplying of power to the load during the power source transfer.

As shown in FIG. 4, at time t1, the second power source S2 supplies power to the compensation power source module 350 through the switched-on fourth mechanical switch CTR4, and the inverter VSI connected to the load 120 in the compensation power source module 350 continuously supplies power to the load 120 from time t1. For example, the rectifier AC-DC in the compensation power source module 350 first converts the output current of the second power source S2 into a DC current, and then the inverter VSI converts the DC current received from the rectifier AC-DC into a three-phase AC current synchronized with the phase of the output current of the first power source S1, and at the same time, the inverter VSI can invert and output an inverted voltage to supply power to the load 120.

While the inverter VSI outputs the inverted voltage to supply power to the load 120, as described above, the control unit CNTR controls the second mechanical switch CTR2 to be switched on and the first mechanical switch CTR1 to be switched off. Moreover, when the second solid-state switch SCR2 is switched on (i.e., at time t4 in FIG. 4), the inverter VSI stops supplying power to the load 120, and instead the second power source S2 starts supplying power to the load 120.

Therefore, from time t4, it is the second power source S1 that supplies power to the load 120 via the second solid-state switch SCR2 and the second mechanical switch CTR2, whereas it is no longer the initial first power source S1 that supplies power to the load 120 via the first solid-state switch SCR1 and the first mechanical switch CTR1, then it can be considered that the transferring of power source for the power supply system has been realized, that is, the switching of from supplying power by the first power source S1 to supplying power by the second power source S2 has been realized.

FIG. 4 further shows that after transferring from the first power source S1 to the second power source S2 is completed, the fourth mechanical switch CTR4 in the auxiliary circuit 330 may be controlled to be switched off and the third mechanical switch CTR3 to be switched on, so as to prepare for the possible subsequent transferring from the second power source S2 to the first power source S1. As shown in FIG. 4, for example, the control unit CNTR in FIG. 2 indicates the fourth mechanical switch CTR4 to be switched off at time t5 and the third mechanical switch CTR3 to be switched on at time t6.

It should be understood that in the examples as given above, the power source transfer process is automatically triggered due to the fault of the first power source S1, but in other examples, the power source transfer process can also be performed in response to manual instructions, which is not limited by the present application. In addition, the power source transfer process is described above with reference to a three-phase source, but it should be understood that the above power source transfer process is also applicable to transfer of single-phase power source.

As described above, in order to avoid zero potential drift, both the first mechanical switch CTR1 and the second mechanical switch CTR2 are in on state during a period of time between time t2 and time t3, that is, there appears a phenomenon of "neutral overlapping", which is also called "neutral overlapping", between time t2 and time t3 for the neutral line of the first power source S1 and the neutral line of the second power source S2. Conventionally, the duration for neutral overlapping implemented by mechanical switch is generally long (e.g., as shown in FIG. 4, the duration between time t2 and time t3 is generally more than 10 ms), and the withstand voltage for isolation is not enough. However, if the isolated solid-state switch is used to replace the mechanical switch for the power source transfer process, although the duration for neutral overlapping may be controlled relative to the mechanical switch, the neutral line will float to the ground, resulting in neutral-ground voltage (i.e., the voltage between the neutral line and the ground line of the power supply system) being too high. In the above embodiment of the isolated solid-state switch in conjunction with the mechanical switch, the switching of the neutral overlapping may be controlled by the mechanical switch, so that the neutral line floating to the ground can be avoided, while the isolated solid-state switch can improve the withstand voltage for isolation, but it is still difficult to achieve a short duration for neutral overlapping less than 10 ms in this way, circulating current will be easily introduced into the circuit.

As described above, automatic transfer switch (ATS) may be used in the power supply system for data center to achieve continuity of data services. However, when the ATS is applied to the power supply system for data center, it is required to control the neutral-ground voltage in some cases besides strict requirements on the transfer duration (generally, the transfer duration is less than 10 ms). In general, there are two main reasons for the formation of the neutral-ground voltage: (1) unbalanced three-phase load and (2) unreliable grounding. According to the existing design specification ("*Design Specification for Machined Room of Electronic Information System*" GB 50174-2008), it is required that the neutral-ground voltage of the machine room should be controlled to be within 2V, whereas a higher neutral-ground voltage may lead to hardware fault, burn down equipment, cause misoperation of control signals, affect the quality of communication, and the like. In practice, when the neutral-ground voltage is above a certain threshold (e.g., 2V), the server in the machine room will unable to be started. For example, when a user wants to install a certain load (such as an HP minicomputer and an IBM server) in the machine room, if the neutral-ground voltage of the machine room is greater than 2V, the load cannot be installed as expected. In other words, when the ATS is applied to the power supply system for data center, it is required not only to ensure that the neutral lines overlap during the power source transfer to avoid the neutral-ground voltage being above the threshold value (e.g., 2V) due to neutral line floating to the ground, but also to control the duration for neutral overlapping to be less than, for example, 10 ms.

In order to solve the above issues, the present disclosure provides a power source transfer circuit, which introduces a new bypass circuit, such as a bypass switch, on the neutral line led out from the power source. The new bypass circuit may include switch elements, for example, at least one mechanical switch and at least one solid-state switch, to control the neutral overlapping duration during the power source transfer to be as short as possible, so as to realize the switching of the neutral overlapping at microsecond.

Specifically, according to at least one embodiment of the present disclosure, there is provided a power source transfer circuit for switching among a plurality of power sources to supply power to a load. The power source transfer circuit comprises a first switch, a second switch and a bypass switch, wherein one of the plurality of power sources supplies power to the load via the first switch and the second switch, and the bypass switch is connected in parallel to the second switch on a neutral line and is configured to control the neutral overlapping duration during switching among the plurality of power sources. The power source transfer circuit including the bypass switch provided by the present disclosure can control the duration for the switching of the neutral overlapping during the power source transfer, shorten the switching duration to microsecond, and achieve a fast and reliable response.

Figure 5:
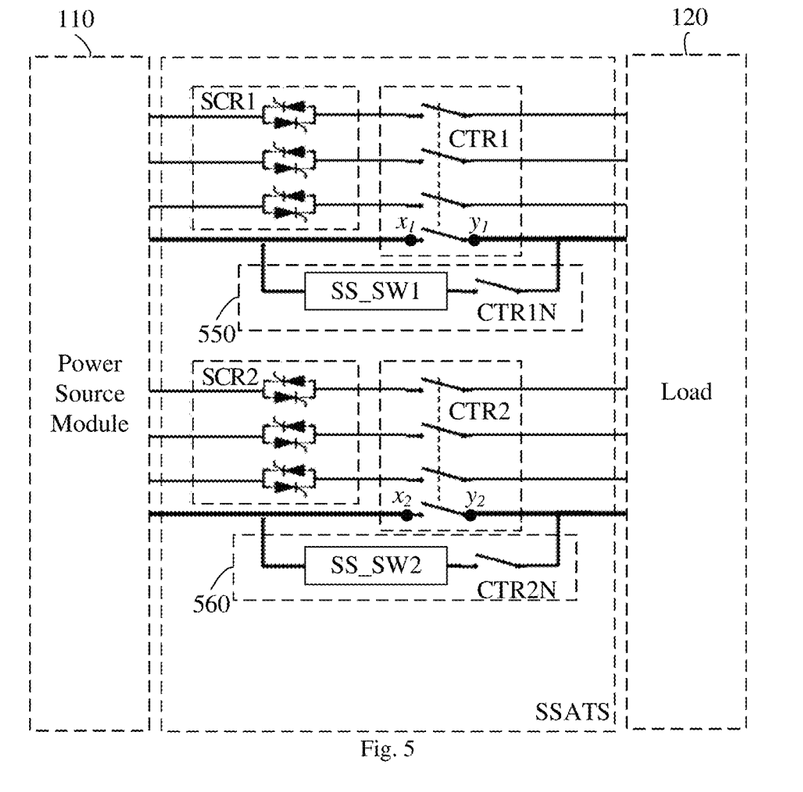
FIG. 5 shows a diagram of a switch module in a power source transfer circuit according to at least one embodiment of the present disclosure.

FIG. 5 shows a circuit diagram of a power source transfer circuit SSATS according to at least one embodiment of the present disclosure. For the sake of brevity, only the circuit structure part of the power source transfer circuit SSATS related to the first switch module and the second switch module are shown in detail here, but it should be understood that as described above, the power source transfer circuit SSATS may further include an auxiliary circuit (e.g., the auxiliary circuit AUX in FIG. 1 and the auxiliary circuit 330 in FIG. 3A or 3B), which will not be repeated here.

As shown in FIG. 5, the power source transfer circuit SSATS includes a first solid-state switch SCR1 and a first mechanical switch CTR1, wherein the first solid-state switch SCR1 is connected to the first mechanical switch CTR1, and the power source module 110 may be connected to the load 120 via the first solid-state switch SCR1 and the first mechanical switch CTR1 to supply power to the load 120. Further, the first solid-state switch SCR1 is connected to the phase line of the first power source S1, and the first mechanical switch CTR1 is connected to both the phase line and the neutral line of the first power source S1. Wherein the first mechanical switch includes a first terminal x1 and a second terminal y1, both of which are connected to the neutral line of the first power source S1.

As shown in FIG. 5, the power source transfer circuit SSATS includes a first bypass switch 550 which is connected in parallel to the first mechanical switch CTR1 on the neutral line, and a first terminal of the first bypass switch 550 is connected to the first terminal x1 of the first mechanical switch CTR1, and a second terminal of the first bypass switch 550 is connected to the second terminal y1 of the first mechanical switch CTR1. Wherein the first bypass switch 550 may include a solid-state switch SS_SW1 and a mechanical switch CTR1N connected in series. In some embodiments, other elements, for example, impedance devices such as small inductors, may also be connected in series in the first bypass switch 550 to suppress the instantaneous circulating current circuit.

As shown in FIG. 5, the power source transfer circuit SSATS may further include a second solid-state switch SCR2, a second mechanical switch CTR2, and a second bypass switch 560. The second solid-state switch SCR2 is connected to the phase line of the second power source S2, and the second mechanical switch CTR2 is connected to both the phase line and the neutral line of the second power source S2. Wherein the second mechanical switch includes a first terminal x2 and a second terminal y2, both of which are connected to the neutral line of the second power source S2. Similar to the first bypass switch 550, the second bypass switch 560 is connected in parallel to the second mechanical switch CTR2 on the neutral line, a first terminal of the second bypass switch 560 is connected to the first terminal x2 of the second mechanical switch CTR2, and a second terminal of the second bypass switch 560 is connected to the second terminal y2 of the second mechanical switch CTR2. Wherein the second bypass switch 560 may include a solid-state switch SS_SW2 and a mechanical switch CTR2N connected in series. Likewise, other elements may also be connected in series in the second bypass switch 560, like the first bypass switch 550, which will not be repeated here.

Although FIG. 5 only shows that the power source transfer circuit SSATS includes two bypass switches, i.e., the first bypass switch 550 and the second bypass switch 560, it should be understood that more than two bypass switches may be included according to different structures of the power source transfer circuit SSATS. For example, when three or more neutral lines are led out from the power source module and connected to the load, correspondingly, each of the neutral lines may be connected to a bypass switch.

The operating principle of the power source transfer circuit SSATS shown in FIG. 5 in a three-phase source power supply system circuit 60 will be described in conjunction with to FIGS. 6 and 7.

Figure 6:
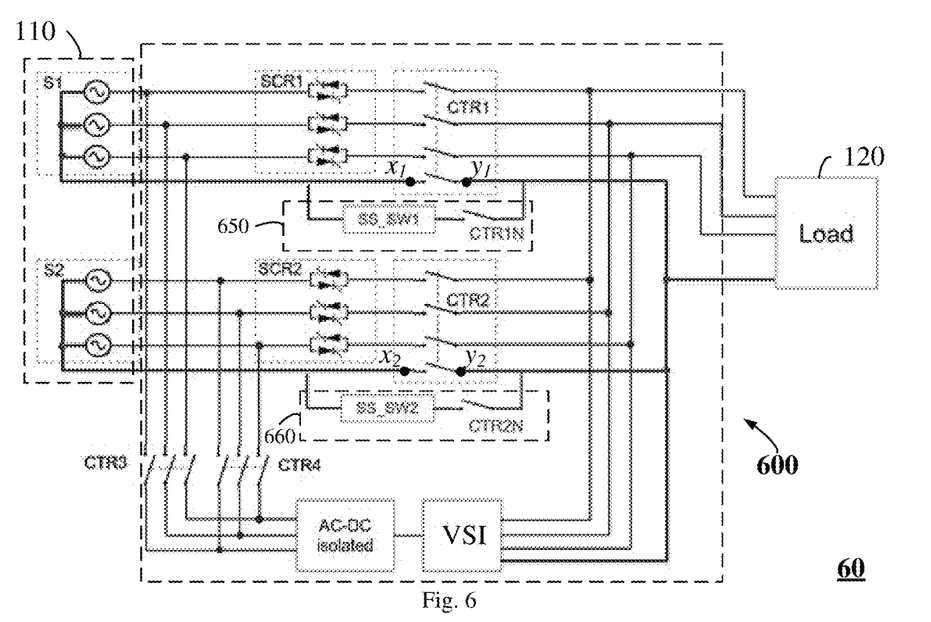
FIG. 6 shows a structural diagram of a power source transfer circuit according to at least one embodiment of the present disclosure.

FIG. 6 shows a diagram of a three-phase source power supply system circuit 60 according to at least one embodiment of the present disclosure.

Similar to the three-phase source power supply system circuit 30B shown in FIG. 3B, as shown in FIG. 6, the three-phase source power supply system circuit 60 may include a power source module 110, a power source transfer circuit 600 and a load 120, wherein the power source module 110 is connected to the load 120 through the power source transfer circuit 600 to supply power to the load 120. The power source module 110 may include a first power source S1 and a second power source S2. In this embodiment, both the first power source S1 and the second power source S2 as shown are three-phase sources, but it should be understood that the following description with respect to this embodiment is also applicable to the single-phase source power supply system circuit, that is, the case where both the first power source S1 and the second power source S2 are single-phase sources.

Compared with the power source transfer circuit 300 of FIGS. 3A and 3B, the power source transfer circuit 600 further includes a first bypass switch 650 and a second bypass switch 660 on the basis of the power source transfer circuit 300. Therefore, the content of the same part of the power source transfer circuit 600 as that of the power source transfer circuit 300 can refer to the above description with respect to FIGS. 3A and 3B and will not be repeated here. The first bypass switch 650 and the second bypass switch 660 will be described in detail below.

As shown in FIG. 6, the first power source S1 is connected to the load 120 via the first solid-state switch SCR1 and the first mechanical switch CTR1 through the led out three phase lines and the first neutral line. Similarly, the second power source S2 is connected to the load 120 via the second solid-state switch SCR2 and the second mechanical switch CTR2 through the led out three phase lines and the second neutral line. As shown, the first solid-state switch SCR1 is connected to the phase line of the first power source S1, the first mechanical switch CTR1 is connected to both the phase line and the neutral line of the first power source S1, the second solid-state switch SCR2 is connected to the phase line of the second power source S2, and the second mechanical switch CTR2 is connected to both the phase line and the neutral line of the second power source S2.

As shown in FIG. 6, the first bypass switch 650 is connected in parallel to the first mechanical switch CTR1 on the neutral line. A first terminal of the first bypass switch 650 is connected to the first terminal x1 of the first mechanical switch CTR1 connected to the first neutral line, and a second terminal of the first bypass switch 650 is connected to the second terminal y1 of the first mechanical switch CTR1 connected to the first neutral line. The first bypass switch 650 includes a third solid-state switch SS_SW1 and a fifth mechanical switch CTR1N connected in series.

As shown in FIG. 6, the second bypass switch 660 is connected in parallel to the second mechanical switch CTR2 on the neutral line. A first terminal of the second bypass switch 660 is connected to the first terminal x2 of the second mechanical switch CTR2 connected to the second neutral line, and a second terminal of the second bypass switch 660 is connected to the second terminal y2 of the second mechanical switch CTR2 connected to the second neutral line. The second bypass switch 660 includes a fourth solid-state switch SS_SW2 and a sixth mechanical switch CTR2N connected in series.

By setting the first bypass switch 650 and the second bypass switch 660, a first neutral line bypass and a second neutral line bypass may be introduced for the first neutral line and the second neutral line, respectively. Therefore, unlike as described above that it is required to avoid the neutral line floating to the ground by controlling the first mechanical switch and the second mechanical switch to keep the first neutral line and the second neutral overlapping for a certain period of time during the power source transfer, alternatively, the "neutral overlapping" may be implemented by controlling the first bypass switch 650 and the second bypass switch 660 to keep the first neutral line bypass and the second neutral line bypass overlapping for a certain period of time during the power source transfer. Compared with the neutral overlapping implemented via the first neutral line and the second neutral line by means of the first mechanical switch and the second mechanical switch, the duration for the neutral overlapping implemented by means of the first neutral line bypass and the second neutral line bypass is shorter, so that the power source transfer circuit can have superior performance. Next, how to shorten the neutral overlapping duration by controlling the first bypass switch 650 and the second bypass switch 660 will be described in conjunction with to FIG. 7.

Figure 7:
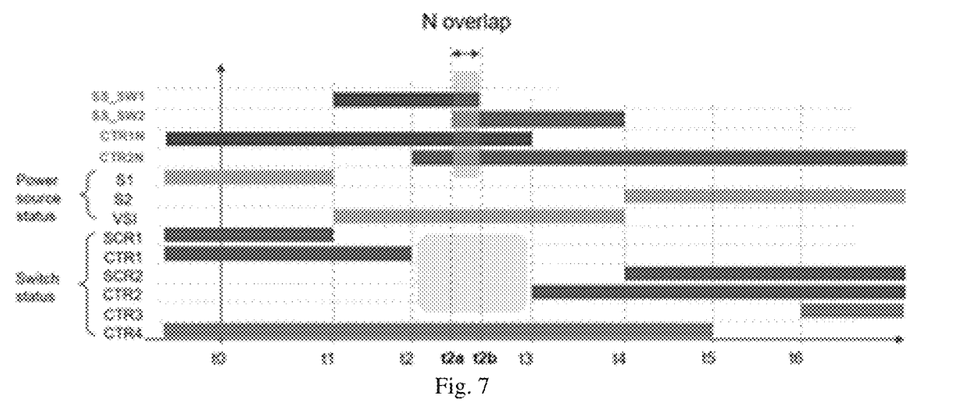
FIG. 7 shows a timing diagram of the power supply system circuit of FIG. 6.

FIG. 7 shows a timing diagram of the three-phase source power supply system circuit 60 of FIG. 6.

It is assumed that during normal operation, the first power source S1 supplies power to the load 120 via the first solid-state switch SCR1 and the first mechanical switch CTR1. That is, as shown in FIG. 7, before time t0, the first solid-state switch SCR1 and the first mechanical switch CTR1 are switched on, and the first power source S1 supplies power to the load 120 via the switched-on first solid-state switch SCR1 and the switched-on first mechanical switch CTR1, thus the neutral line led out from the first power source S1 is switched on. At this time, the third solid-state switch SS_SW1 in the first bypass switch 650 of the first neutral line bypass led out from the first power source S1 is switched off, whereas the fifth mechanical switch CTR1N remains in on state, in other words, the first neutral line bypass is in off state at this time.

When the first power source S1 fails at time t0 and the fault in the first power source S1 is detected at time t1, as shown in FIG. 7, at time t1, the first solid-state switch SCR1 is switched off and the first power source S1 stops supplying power to the load 120. Meanwhile, at time t1, the third solid-state switch SS_SW1 in the first bypass switch 650 is switched on. Since the fifth mechanical switch CTR1N is always in on state, from time t1, the first bypass switch 650 is switched on and a conducted first neutral line bypass is formed.

After the third solid-state switch SS_SW1 is switched on, that is, after the first neutral line bypass is switched on, the first mechanical switch CTR1 is switched off and the sixth mechanical switch CTR2N is switched on. As shown in FIG. 7, at time t2, the first mechanical switch CTR1 is switched off, while the sixth mechanical switch CTR2N is switched on. Due to the delay of the mechanical switch itself as described above, the first mechanical switch CTR1 is switched off after a period of time from time t2, and likewise, the sixth mechanical switch CTR2N is switched on after a period of time from time t2.

After the first mechanical switch CTR1 is switched off and the sixth mechanical switch CTR2N is switched on, the fourth solid-state switch SS_SW2 in the second bypass switch 660 is switched on. As shown in FIG. 7, at time t2a, the fourth solid-state switch SS_SW2 in the second bypass switch 660 is switched on. At this time, the second bypass switch 660 is also in on state, and a conducted second neutral line bypass is formed.

After the fourth solid-state switch SS_SW2 is switched on, the third solid-state switch SS_SW1 in the first bypass switch 650 is switched off. As shown in FIG. 7, at time t2b, the third solid-state switch SS_SW1 in the first bypass switch 650 is switched off, so that the first bypass switch 650 is switched off from time t2b, and thus the first neutral line bypass is switched off from time t2b. In other words, between time t2a and time t2b, the transfer from the conducted first bypass switch 650 to the conducted second bypass switch 650 is completed. Moreover, as shown in FIG. 7, since the second neutral line bypass is in on state from timing t2a, whereas the first neutral line bypass is switched off from timing t2b, in this embodiment, the neutral lines only overlap between time t2a and time t2b. Since the solid-state switch has no mechanical delay compared with the mechanical switch, the time t2a and the time t2b here are controllable. In other words, the duration for neutral overlapping may be controlled by controlling the switching-on of the fourth solid-state switch SS_SW2 and the switching-off of the third solid-state switch SS_SW1, so that the duration for neutral overlapping can be shortened to microsecond.

Then, after the third solid-state switch SS_SW1 is switched off, the fifth mechanical switch CTR1N in the first bypass switch 650 is switched off and the second mechanical switch CTR2 is switched on, and after the second mechanical switch CTR2 is switched on, the fourth solid-state switch SS_SW2 in the second bypass switch is switched off and the second solid-state switch SCR2 is switched on, so that the switching of the first power source S1 to the second power source S2 is realized to supply power to the load 120. As shown in FIG. 7, at time t3, the fifth mechanical switch CTR1N is switched off and the second mechanical switch CTR2 is switched on. When the second mechanical switch CTR2 is switched off after a period of duration from time t3 and the fifth mechanical switch CTR1N is switched on after a period of time from time t3, at time t4, the fourth solid-state switch SS_SW2 is switched off and the second solid-state switch SCR2 is switched on, so that from time t4, the second power source S2 can directly supply power to the load 120 via the switched-on second solid-state switch SCR2 and the second mechanical switch CTR2, and the second bypass switch 660 is switched off, thereby completing the process of switching from supplying power by the first power source S1 to supplying power by the second power source S2.

Similar to FIG. 4, during the transferring from the first power source S1 to the second power source S2 to supply power to the load 120, the compensation circuit module in the auxiliary circuit (e.g., the inverter VSI therein) may be used to supply power to the load 120, so as to maintain continuous power supply to the load 120. As shown in FIG. 7, at time t1, the second power source S2 supplies power to the compensation power source module through the switched-on fourth mechanical switch CTR4, so that the inverter VSI in the compensation power source module continuously supplies power to the load 120 from time t1. At time t4, the inverter VSI stops supplying power to the load 120, and instead transfers to supplying power to the load 120 by the second power source S2. The specific details can refer to the above description with respect to FIG. 4, which will not be repeated here.

Therefore, compared with the controlling of the duration of neutral overlapping by controlling the first mechanical switch CTR1 and the second mechanical switch CTR2 shown in FIG. 4, during the power source transfer shown in FIG. 7, the duration of neutral overlapping during switching among a plurality of power sources (e.g., the first power source S1 and the second power source S2) is controlled by controlling the third solid-state switch SS_SW1 in the first bypass switch and the fourth solid-state switch SS_SW2 in the second bypass switch, which can lead to a shorter duration of neutral overlapping, realize the switching of the neutral overlapping in microsecond, so that the power source transfer circuit can be applied to a wider range of fields. For example, the power source transfer circuit according to at least one embodiment of the present disclosure can be used for a transfer device to provide continuous power supply to a load. Alternatively, the power source transfer circuit according to at least one embodiment of the present disclosure can be used in the power supply system for data center to achieve continuity of data services.

There are several points that need to be explained as follows
(1) The drawings of the embodiments of the present disclosure only relate to the structures involved in the embodiments of the present disclosure, and other structures can refer to usual designs.

(2) In case of no conflict, the embodiments of the present disclosure and the features in the embodiments can be combined with each other, so as to obtain new embodiments.

The above is only the specific implementation of the present disclosure, but the protection scope of the present disclosure is not limited to this, and the protection scope of the present disclosure should be subject to the protection scope of the claims.

The invention claimed is:

1. A power source transfer circuit for switching among a plurality of power sources to supply power to a load, the power source transfer circuit comprising:
a first switch;
a second switch; and
a bypass switch,
wherein one of the plurality of power sources supplies power to the load via the first switch and the second switch, and
wherein the bypass switch is connected in parallel to the second switch on a neutral line and is configured to control neutral overlapping duration during switching among the plurality of power sources, and wherein the bypass switch includes a first bypass switch and a second bypass switch, the first bypass switch includes a third solid-state switch and a fifth mechanical switch connected in series, and the second bypass switch includes a fourth solid-state switch and a sixth mechanical switch connected in series.

2. The power source transfer circuit according to claim 1, wherein, the second switch is a mechanical switch.

3. The power source transfer circuit according to claim 1, wherein the first switch includes a first solid-state switch and a second solid-state switch, and the second switch includes a first mechanical switch and a second mechanical switch, wherein
the first solid-state switch is connected to the first mechanical switch, and a first power source of the plurality of power sources is connected to the load via the first solid-state switch and the first mechanical switch,
the second solid-state switch is connected to the second mechanical switch, and a second power source of the plurality of power sources is connected to the load via the second solid-state switch and the second mechanical switch, and
wherein when the first power source fails to supply power to the load, the first switch and the second switch are configured to switch to supply power to the load from the second power source.

4. The power source transfer circuit according to claim 3, wherein the first mechanical switch includes a first terminal and a second terminal connected to a first neutral line led out from the first power source, and the second mechanical switch includes a first terminal and a second terminal connected to a second neutral line led out from the second power source, and
wherein the bypass switch being connected in parallel to the second switch on the neutral line comprises:
a first terminal of the first bypass switch being connected to the first terminal of the first mechanical switch, a second terminal of the first bypass switch being connected to the second terminal of the first mechanical switch, and
a first terminal of the second bypass switch being connected to the first terminal of the second mechanical switch, and a second terminal of the second bypass switch being connected to the second terminal of the second mechanical switch.

5. The power source transfer circuit according to claim 4, wherein the controlling neutral overlapping duration during switching among the plurality of power sources comprises: controlling, by the third solid-state switch and the fourth solid-state switch, the neutral overlapping duration during switching among the plurality of power sources.

6. The power source transfer circuit according to claim 5, wherein when the first power source supplies power to the load, the fifth mechanical switch in the first bypass switch remains on, and wherein
switching from supplying power by the first power source to the load to supplying power by the second power source to the load comprises:
switching on the third solid-state switch in the first bypass switch when the first solid-state switch is switched off;
switching off the first mechanical switch and switching on the sixth mechanical switch in the second bypass switch after the third solid state switch is switched on;
switching on the fourth solid-state switch in the second bypass switch after the first mechanical switch is switched off and the sixth mechanical switch is switched on;
switching off the third solid-state switch in the first bypass switch after the fourth solid-state switch is switched on;
switching off the fifth mechanical switch in the first bypass switch and switching on the second mechanical switch after the third solid-state switch is switched off;
switching off the fourth solid-state switch in the second bypass switch and switching on the second solid-state switch after the second mechanical switch is switched on, so as to realize the switching of the first power source to the second power source to supply power to the load.

7. The power source transfer circuit according to claim 1, further comprising:
an auxiliary circuit connected between a power source module including the plurality of power sources and the load, wherein the auxiliary circuit includes:
a compensation power source module configured to provide continuous power supply to the load during switching among the plurality of power sources; and
a power fetching module, connected between the power source module and the compensation power source module, configured to fetch power for the compensation power source module from one of the plurality of power sources.

8. The power source transfer circuit according to claim 7, wherein the compensation power source module includes a rectifier and an inverter connected in series,
wherein the power fetching module includes a third mechanical switch and a fourth mechanical switch, wherein:
the third mechanical switch is connected between a first power source of the plurality of power sources and the rectifier,
the fourth mechanical switch is connected between a second power source of the plurality of power sources and the rectifier, and
the inverter is connected to the load.

9. The power source transfer circuit according to claim 8, wherein when the first power source supplies power to the load, the fourth mechanical switch remains on, so that when the first power source fails to supply power to the load, the inverter supplies power to the load.

10. The power source transfer circuit according to claim 9, wherein the supplying power to the load by the inverter when the first power source fails to supply power to the load comprises:
  when the first power source stops supplying power to the load via the first solid-state switch and the first mechanical switch, supplying power to the load by the inverter, and
  when the second power source starts supplying power to the load via the second solid-state switch and the second mechanical switch, stopping supplying power to the load by the inverter, so as to realize continuous supplying of power to the load during power source transfer.

11. A transfer device comprising the power source transfer circuit according to claim 1 for continuous supplying power to the load.

12. A power supply system for a data center, comprising the power source transfer circuit according to claim 1, to realize continuity of data services.

\* \* \* \* \*